(12) United States Patent
Vadekar

(10) Patent No.: US 7,769,169 B2
(45) Date of Patent: Aug. 3, 2010

(54) METHOD AND APPARATUS FOR GENERATING A KEY STREAM

(75) Inventor: Ashok Vadekar, Rockwood (CA)

(73) Assignee: Certicom Corp., Mississauga (CA)

( * ) Notice: Subject to any disclaimer, the term of this patent is extended or adjusted under 35 U.S.C. 154(b) by 1078 days.

(21) Appl. No.: 10/348,756

(22) Filed: Jan. 23, 2003

(65) Prior Publication Data

US 2003/0174836 A1    Sep. 18, 2003

Related U.S. Application Data

(60) Provisional application No. 60/350,017, filed on Jan. 23, 2002, provisional application No. 60/350,380, filed on Jan. 24, 2002.

(51) Int. Cl.
*H04L 9/00* (2006.01)

(52) U.S. Cl. ........................................................ 380/44
(58) Field of Classification Search .................... 380/44
See application file for complete search history.

(56) References Cited

U.S. PATENT DOCUMENTS

| | | | | |
|---|---|---|---|---|
| 5,107,451 | A * | 4/1992 | Houk | 708/491 |
| 5,202,846 | A * | 4/1993 | Rasmussen et al. | 708/276 |
| 2001/0029524 | A1 * | 10/2001 | Smith et al. | 709/206 |
| 2002/0048364 | A1 * | 4/2002 | Gligor et al. | 380/37 |
| 2003/0091185 | A1 * | 5/2003 | Swindlehurst et al. | 380/44 |
| 2003/0206634 | A1 * | 11/2003 | Rose | 380/265 |

OTHER PUBLICATIONS

Menezes, Alfred, Paul Oorschot, Scott Vanstone. Handbook of Applied Cryptography. CRC Press, 1997. p. 399.*
Yahoo.ca Press Release "RSA Security Helps Create Solution to Secure Wireless LANs", Dec. 17, 2001 (http://biz.yahoo.com/prnews/011217/sfm074_1.html).
Yahoo.ca Press Release "RSA announces fix for wireless network security hole", Dec. 27, 2001 (http://biz.yahoo.com/rf/011217/n14192804_2.html).

* cited by examiner

*Primary Examiner*—Kambiz Zand
*Assistant Examiner*—Jason K Gee
(74) *Attorney, Agent, or Firm*—John R.S. Orange; Blake, Cassels & Graydon LLP

(57) ABSTRACT

A method of generating a key stream for a precomputed state information table. The method comprises initialising a counter and an accumulator with non-zero values; combining state information identified by the counter with the accumulator; swapping state information identified by the counter with state information identified by the accumulator; combining the two pieces of state information; outputting the state information identified by the combination as a byte of the key stream; adding a predetermined number odd number to the counter; and repeating the above steps to produce each byte of the key stream.

23 Claims, 3 Drawing Sheets

METHOD AND APPARATUS FOR GENERATING A KEY STREAM

This application claims the benefit of provisional applications Nos. 60/350,017 and 60/350,380, filed Jan. 23, 2002 and Jan. 24, 2002, respectively, the contents of each being hereby incorporated by reference.

FIELD OF THE INVENTION

The present invention relates to generating a key stream.

DESCRIPTION OF THE PRIOR ART

Early multimedia broadcasts consisted of radio or television programs sent over the air waves. Anyone with a tuner could access the broadcast. Premium services impose access controls by such means as scrambling the signals. Content providers control access to the descramblers.

There are many types of multimedia transmissions including radio, television, sound, video, and animations. This may be sent over land lines or over wireless channels, over long or short distances, or even through satellite transmission, or through a combination of channels.

When multimedia content is broadcast, it is often desired to prevent unauthorized parties from reading the content. This may be accomplished by encrypting the content using a stream cipher. A secret key is used in the encryption and must be shared with the desired recipients of the content.

A commonly used stream cipher which may be used for multimedia broadcasts is known by the trade name RC4. However, this stream cipher has been shown to have certain weaknesses, which may be exploited. These include the invariance weakness, and some leakage of keying material.

Therefore it is an object of the present invention to obviate or mitigate the above disadvantages.

SUMMARY OF THE INVENTION

According to one aspect of the present invention, there is provided a method of generating a key stream from a precomputed state information table. The method comprises initialising a counter and an accumulator with non-zero values; combining state information identified by the counter to the accumulator; swapping state information identified by the counter with state information identified by the accumulator; combining the two pieces of state information; outputting the state information identified by the combination as a byte of the key stream; adding a predetermined odd number to the counter; and repeating the above steps to produce each byte of the key stream.

In another aspect of the present invention, there is provided a computer readable medium containing instructions for a computer to generate a key stream from a precomputed state information table. The key stream generation comprises initialising a counter and an accumulator with non-zero values; combining state information identified by the counter with the accumulator; swapping state information identified by the counter with state information identified by the accumulator; combining the two pieces of state information; outputting the state information identified by the combination as a byte of the key stream; combining a predetermined odd number with the counter; and repeating the above steps to produce each byte of the key stream.

A further aspect of the present invention, there is provided in a stream cipher, a method of generating a key stream from state information derived from a secret key. The improvement comprises initialising registers to non-zero values; and incrementing a counter with a predetermined odd number greater than 1.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
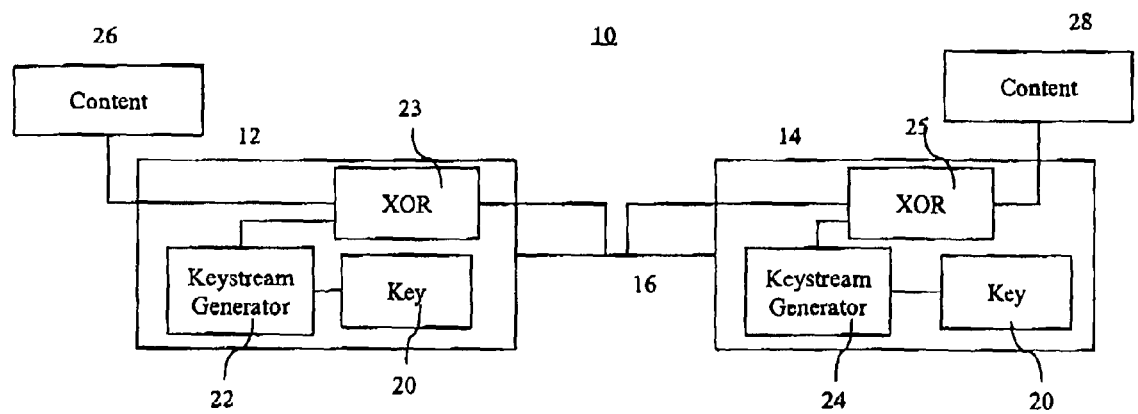
FIG. 1 is a schematic representation of communication system.

Referring to FIG. 1, a communication system 10 includes a pair of correspondents 12, 14. A communication channel 16 allows the correspondents to communicate with each other. The correspondents 12, 14 share a secret key 20 through a secure channel prior to initiating communications. Each correspondent has a key stream generator 22, 24, each connected to a respective XOR gate 23, 25. The correspondent 12 wishes to send content 26 through the communication channel 16 to the correspondent 14, where the content 28 may be recovered and viewed. The key stream generators 22, 24 each use the common secret key 20 to derive a common key stream. The common key stream is used by the correspondent 12 to encrypt the content 26 into an encrypted signal, and by the correspondent 14 to decrypt the encrypted signal and obtain the content 28. The encrypted signal is transmitted over the communication channel 16. The content 26 is a stream of data divided into bytes.

Figure 2:
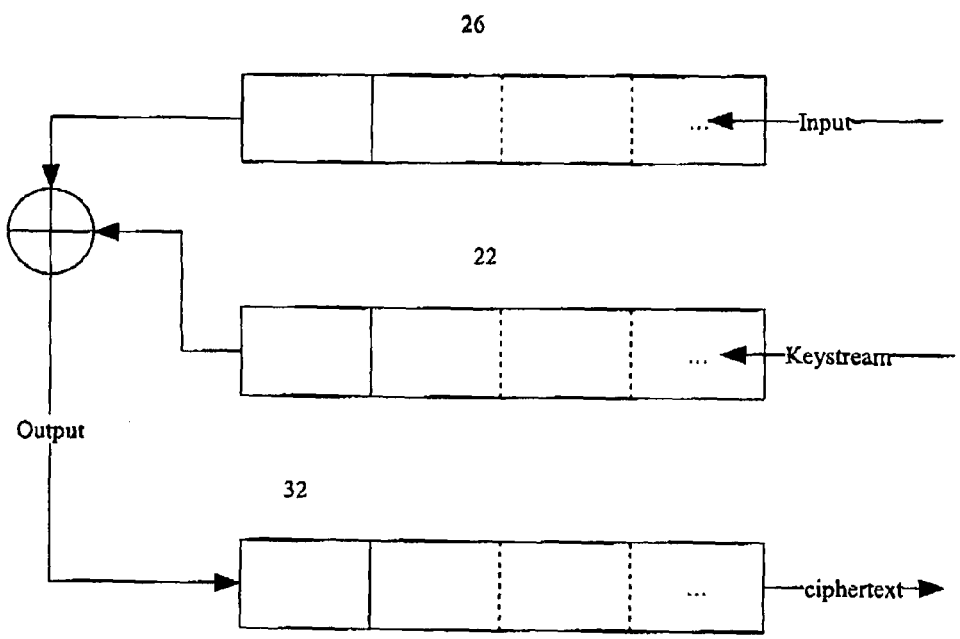
FIG. 2 is a schematic representation of the encryption used in FIG. 1.

Referring to FIG. 2, the nature of the encryption performed by the correspondents 12, 14 is shown in more detail. The encryption operates on each byte of the content 26 in turn. Each byte of the content is encrypted with a corresponding byte of the key stream 22. The bytes of the content and the key stream are operated on by an XOR gate 23, which combines them to obtain the corresponding byte of the output cipher text 32. The XOR gate 23 implements a bitwise exclusive-or operation meaning one or the other but not both.

Figure 3:
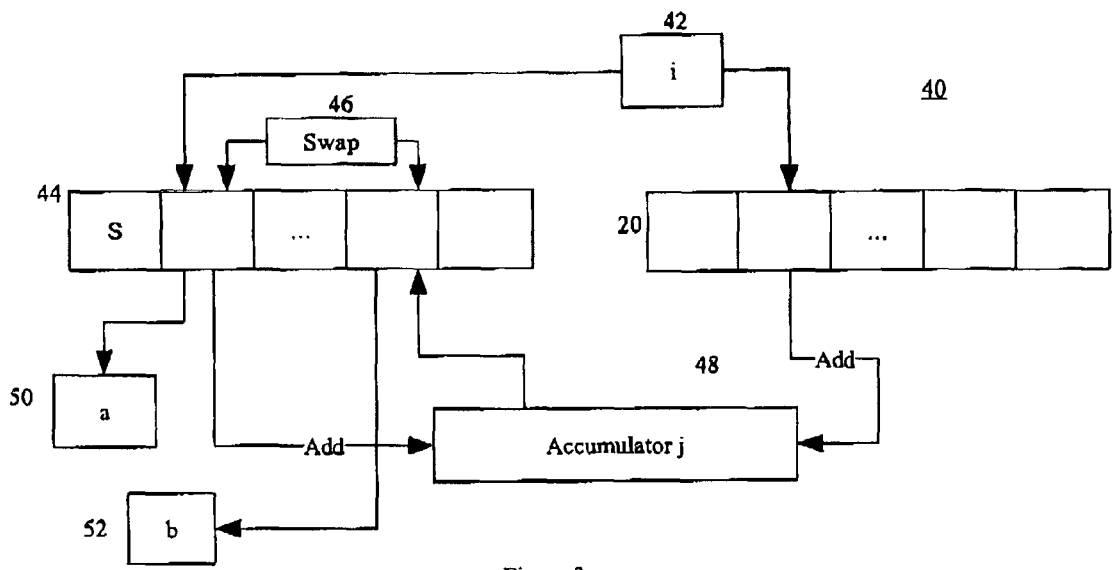
FIG. 3 is a schematic representation of a circuit used in the key stream generator of FIG. 1.

Referring to FIG. 3, initialization of the key stream generator is shown generally as numeral 40. The key stream generator includes a counter i (42), a state information table S (44), a swap mechanism 46, and an accumulator j (48). The state information table S comprises 256 table entries addressed by the numbers 0 to 255, each of which may have a value from 0 to 255. Notationally, S [10] refers to the $10^{th}$ entry in the table for example. Initially, each table entry has the same value as its position, i.e. 0 is in position 0, 1 is in position 1, etc that is, S[i]=I for each from 0 to 255. The key stream generator further includes registers a (50) and b (52). The key stream generator takes as input the key 20. The counter i (42) designates both a position (address) in the table of state information 44 and a corresponding byte in the key 20. The designated table entry and byte of the key are connected to the accumulator j (48) which adds the values mod 256 and stores the result in the accumulator 48. The result in the accumulator 48 designates the address (position) of the entry in the table of the state information S. The swap mechanism 46 connects the table entries in the positions indicated by the counter i and the accumulator j in order to exchange their contents. The registers 50 and 52 operate to add the entries in the state information table designated by i and j to their respective contents a and b.

Figure 4:
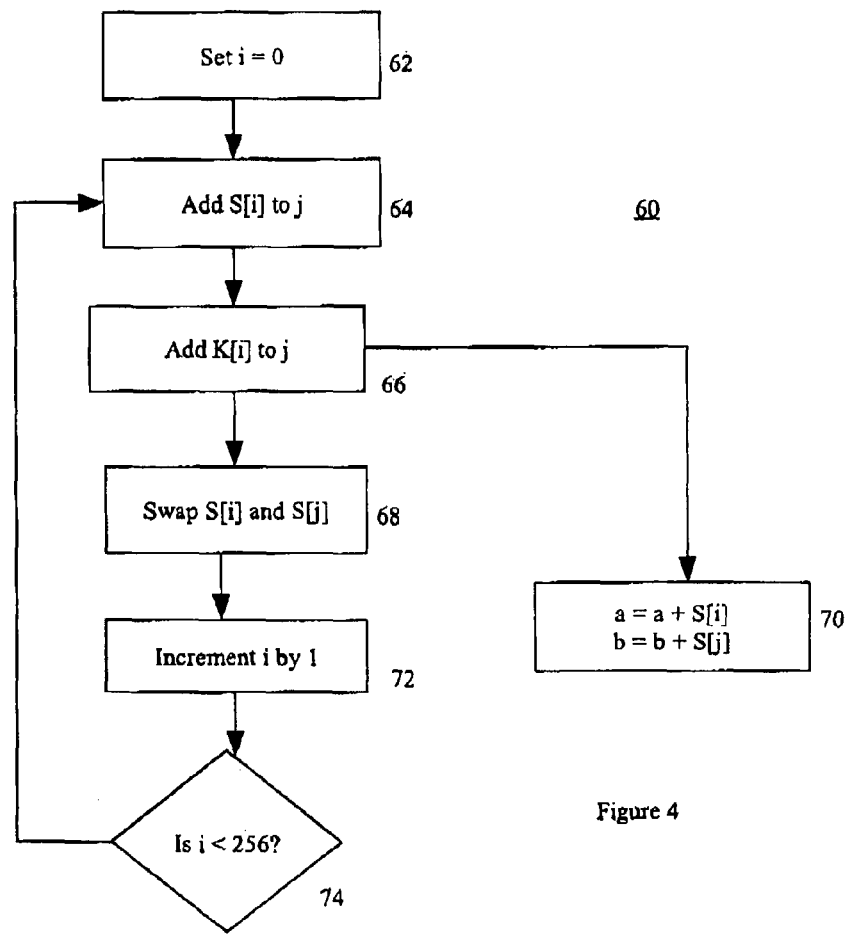
FIG. 4 is a flow chart showing steps performed by the circuit of FIG. 3.

Referring to FIG. 4, the steps performed by the circuit of FIG. 3 are shown generally by the numeral 60. The counter i is first set to 0 (62). Then, the table entry of the state information designated by the number i (that is S[i]) is added to the accumulator j (64). The byte in position i of the key 20 (that is K[i]) is also added to j (66). The table entries in positions i and j in the state information table (S [i] and S[j]) are then added to respective ones of the registers a and b (70), then the table entries in positions i and j (S[i] and S[j]) are exchanged (68). The counter i is incremented (72) by 1. Then, if the counter i is less than 256 (74), the process repeats at step 64. This continues until a total of 256 iterations have been performed. At this time, the entries of the state information table 44 are randomly distributed, due to the random nature of the key within register 20. This mixing is performed prior to transmission over the channel 16. The contents of registers 50, 52 similarly contain a pair of values, accumulated mod 256 in a random manner. The contents of the state information table 44 and the registers 50, 52 are then used to generate a key stream.

Figure 5:
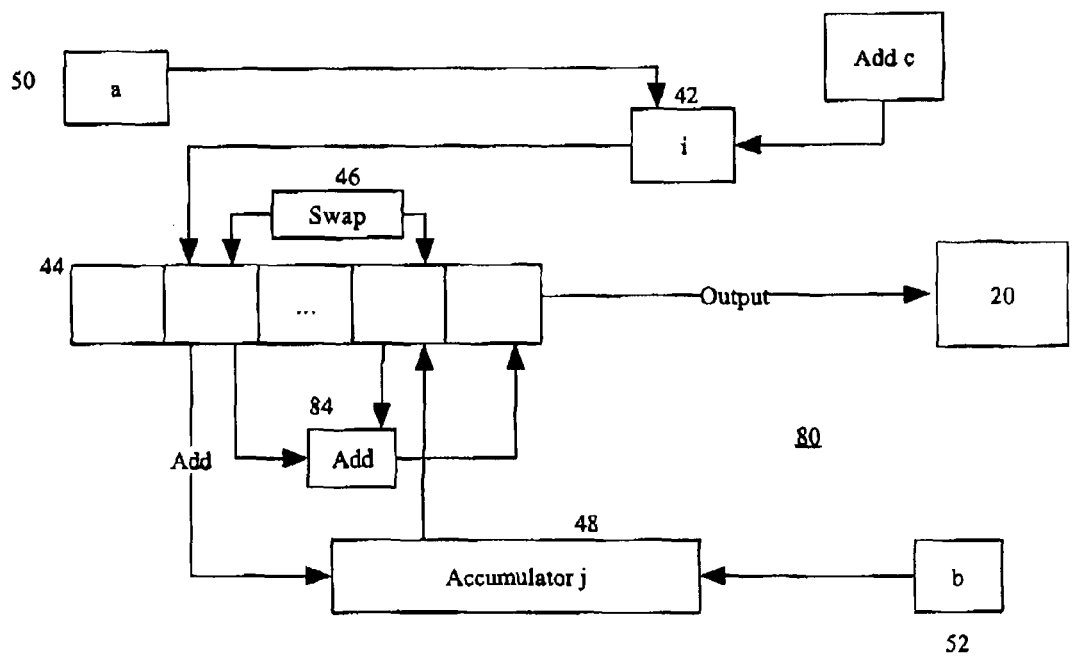
FIG. 5 is a schematic representation of a component of a key stream generator of FIG. 1.

Referring to FIG. 5, the circuit of the key stream generator used to produce the key stream is shown generally as numeral 80 and uses the components described above, as well as an adding circuit 84 and an odd number c. The counter i (42) selects an entry (S[i]) of the state information table S 44, which is in turn connected to the accumulator j (48) for addition thereto. The result stored in the accumulator 48 again designates a table entry of state information 44. The swap mechanism 46 operates to exchange the table entries designated by counter i and accumulator j. The adding circuit 84 is connected to the table entries designated by i and j (namely S[i] and S[j]) to add them together, and to determine the cell designated thereby. The contents of this cell 86 is output as a byte of the key stream. Registers 50 and 52 are connected to the counter i and the accumulator j respectively to initialize the registers 42, 48 with the values a, b.

Figure 6:
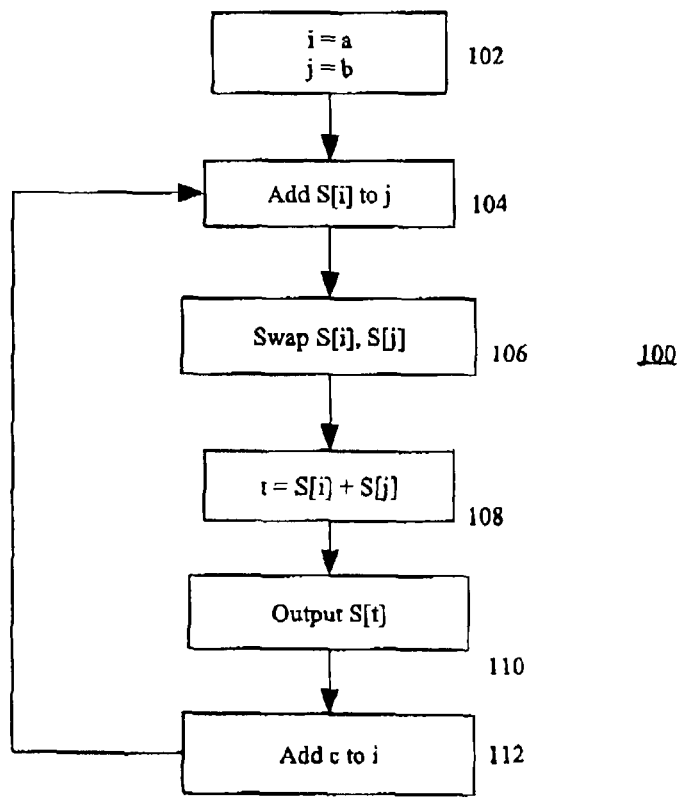
FIG. 6 is a flowchart showing the method of FIG. 5.

Referring to FIG. 6, the steps performed by the circuit of FIG. 5 are shown generally as numeral 100. The counter i is set to the value a (102) and the accumulator j is set to the value b (102). Then, the table entry in position i in the state information table (S [j]) is added to the accumulator j (104). The table entries in positions i and j in the state information table are then exchanged (106). The adding mechanism 84 then computes the value t equal to the sum of the table entries in the positions i and j in the state information table (108). The contents of cell designated t (S[t]) are then output for use as a key stream (110). Then, the value c is added to i (112), and the process repeats with step 104.

It will be recognized that with the provision of the values a and b in the generation of the key stream, there is less predictability than when these values are initially set to 0. Further, the use of a constant value c provides further unpredictability in the order of the swaps performed. The constant value c may be publicly known, and may be derived from a session identifier or an SID. A particularly convenient value to use for c is the bit-wise OR of SID with 1, which is the smallest odd integer larger than or equal to SID.

It will be recognized that the use of 256 positions in the table S is merely for convenience and compatibility with existing protocols. It is possible to use any value n in place of the 256, with appropriate changes to the modular arithmetic, and the initial entries in the state information table. The key stream will then be made up of larger blocks, and accordingly the content would be regarded as larger units as will be understood by one skilled in the art. It will further be understood that the value c should be suitably chosen, and typically will be relatively prime to the modulus n.

For efficiency reasons, the constant c that is used in the key stream generator should be easy to compute from publicly known information and the key K. For security reasons, one should require that gcd(c,n)=1, since the security can be expected to decrease if c and n have a nontrivial common factor. The 'optimal' value of this constant depends on whether or not the keys used with the stream-cipher are correlated and, if so, how.

The embodiment above describes one possible method for computing the initialization value(a,b) used in the key stream generator. There are many options for specifying this initial value; this choice seemed to be the most efficient one. From a security perspective, the main requirement is that the initialization values (a,b) should be unpredictable and uncorrelated if one does not have access to the keys used. In addition, it should be noted that the main attack proposed against RC4 does not seem to work any more, once one takes the initial value (a,b) of the counter pair such that a is sufficiently big.

It may be seen that the circuit of the above embodiment may be made interoperable with RC4 if one takes c=1 and forces (a,b):=(0,0). Further interoperability may be achieved if one takes as key the string Key:=$(K)_N$, where K is the key used with the actual stream-cipher RC4.

It is possible to generalize the stream cipher of the above embodiment even further, e.g., by making the actions of the key stream generator dependent on the key K as well.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of generating a key stream from a precomputed state information table including state information, said method being performed by a correspondent in a communication system and comprising:
   a) initializing a counter and an accumulator with non-zero values by;
      i. initializing said counter;
      ii. combining with a value of the accumulator state information identified by a value of the counter and key information identified by the value of the counter to obtain another value of the accumulator;
      iii. combining state information identified by the value of the counter with a first of said non-zero values;
      iv. combining state information identified by said another value of the accumulator with a second of said non-zero values;
      v. swapping the state information identified by the value of the counter with the state information identified by the another value of the accumulator;
      vi. incrementing the counter to generate another value for the counter; and
      vii. repeating steps ii to vi to produce said non-zero values;
   b) obtaining a constant odd value, c greater than 1, derived from a publicly available session identifier;

c) combining with a current value for the accumulator state information identified by a current value for the counter to obtain a next value for the accumulator;

d) swapping said state information identified by the current value for the counter with state information identified by said next value for the accumulator;

e) combining with said state information identified by said next value for the accumulator said state information identified by the current value for the counter to generate a combined value;

f) outputting the state information identified by the combined value as a byte of the key stream;

g) combining said odd value c with the current value for the counter to generate a next value for said counter; and h) repeating steps c) to g) to produce each byte of the key stream.

2. A method according to claim 1, wherein computations are performed modulo a number n.

3. A method according to claim 2, wherein said odd value c is prime relative to n.

4. A method according to claim 2, wherein said combining in steps c, e, and g are additions modulo n.

5. A method according to claim 2 wherein said number n is 256.

6. A method according to claim 3 wherein said number n is 256.

7. A method according to claim 4 wherein said number n is 256.

8. A method according to claim 1 wherein said odd value c is the smallest odd integer larger than or equal to said session identifier.

9. A computer readable storage medium residing on a computer containing instructions for said computer to generate a key stream from a precomputed state information table, the state information table including state information, said instructions comprising instructions for:

a) initializing a counter and an accumulator with non-zero values by;
   i. initializing said counter;
   ii. combining with a value of the accumulator state information identified by a value of the counter and key information identified by the value of the counter to obtain another value of the accumulator;
   iii. combining state information identified by the value of the counter with a first of said non-zero values;
   iv. combining state information identified by said another value of the accumulator with a second of said non-zero values;
   v. swapping the state information identified by the value of the counter with the state information identified by the another value of the accumulator;
   vi. incrementing the counter to generate another value for the counter; and
   vii. repeating steps ii to vi to produce said non-zero values;

b) obtaining a constant odd value, c greater than 1, derived from a publicly available session identifier;

c) combining with a current value for the accumulator state information identified by a current value for the counter to obtain a next value for the accumulator;

d) swapping said state information identified by the current value for the counter with state information identified by said next value for the accumulator;

e) combining with said state information identified by said next value for the accumulator said state information identified by the current value for the counter to generate a combined value;

f) outputting the state information identified by the combined value as a byte of the key stream;

g) combining said odd value c with the current value for the counter to generate a next value for said counter; and h) repeating steps c) to g) to produce each byte of the key stream.

10. A computer readable storage medium according to claim 9 wherein computations are performed modulo a number n.

11. A computer readable storage medium according to claim 10 wherein said odd number is prime relative to n.

12. A computer readable storage medium according to claim 11 wherein said combining in steps c, e, and g are additions modulo n.

13. A computer readable storage medium according to claim 10 wherein said number n is 256.

14. A computer readable storage medium according to claim 11 wherein said number n is 256.

15. A computer readable storage medium according to claim 12 wherein said number n is 256.

16. A key stream generator for generating a key stream, the key stream generator comprising a counter, an accumulator and a precomputed state information table including state information, said key stream generator being configured for generating said key stream from said precomputed state information table by executing computer executable instructions for:

a) initializing a counter and an accumulator with non-zero values by;
   i. initializing said counter;
   ii. combining with a value of the accumulator state information identified by a value of the counter and key information identified by the value of the counter to obtain another value of the accumulator;
   iii. combining state information identified by the value of the counter with a first of said non-zero values;
   iv. combining state information identified by said another value of the accumulator with a second of said non-zero values;
   v. swapping the state information identified by the value of the counter with the state information identified by the another value of the accumulator;
   vi. incrementing the counter to generate another value for the counter; and
   vii. repeating steps ii to vi to produce said non-zero values;

b) obtaining a constant odd value, c greater than 1, derived from a publicly available session identifier;

c) combining with a current value for the accumulator state information identified by a current value for the counter to obtain a next value for the accumulator;

d) swapping said state information identified by the current value for the counter with state information identified by said next value for the accumulator;

e) combining with said state information identified by said next value for the accumulator said state information identified by the current value for the counter to generate a combined value;

f) outputting state information identified by the combined value as a byte of the key stream;

g) combining said odd value c with the current value for the counter to generate a next value for said counter; and h) repeating steps c) to g) to produce each byte of the key stream.

17. A key stream generator according to claim 16 wherein computations are performed modulo a number n.

18. A key stream generator according to claim 16 wherein said odd number is prime relative to n.

19. A key stream generator according to claim 17 wherein said combining in steps c, e, and g are additions modulo n.

20. A key stream generator according to claim 17 wherein said number n is 256.

21. A key stream generator according to claim 18 wherein said number n is 256.

22. A key stream generator according to claim 19 wherein said number n is 256.

23. A key stream generator according to claim 16 wherein said odd value c is the smallest odd integer larger than or equal to said session identifier.

* * * * *